(12) United States Patent
Berg et al.

(10) Patent No.: US 10,534,776 B2
(45) Date of Patent: Jan. 14, 2020

(54) PROXIMITY GRIDS FOR AN IN-MEMORY DATA GRID

(75) Inventors: Douglas C. Berg, Rochester, MN (US);
Kulvir S. Bhogal, Pflugerville, TX (US); Nitin Gaur, Round Rock, TX (US); Christopher D. Johnson, Rochester, MN (US); Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 13/098,291

(22) Filed: Apr. 29, 2011

(65) Prior Publication Data

US 2012/0278344 A1 Nov. 1, 2012

(51) Int. Cl.
*G06F 16/2455* (2019.01)

(52) U.S. Cl.
CPC .............. *G06F 16/24552* (2019.01)

(58) Field of Classification Search
CPC ......... G06F 17/30182; G06F 2212/254; G06F 16/24552
USPC ....................................................... 707/754
See application file for complete search history.

(56) References Cited

U.S. PATENT DOCUMENTS

| 7,308,528 | B2 | 12/2007 | Kitamura et al. |
| 7,308,538 | B2 | 12/2007 | Shen |
| 7,385,936 | B2 * | 6/2008 | Shipman ............... H04L 41/145 370/252 |
| 7,840,597 | B2 | 11/2010 | Showalter et al. |
| 7,890,463 | B2 * | 2/2011 | Romem ............. G06F 17/30457 707/636 |
| 2004/0167980 | A1 * | 8/2004 | Doyle .................. G06F 9/5072 709/225 |
| 2007/0067315 | A1 * | 3/2007 | Hegde ............... H04L 29/06027 |
| 2009/0179902 | A1 | 7/2009 | Comparan et al. |
| 2010/0106915 | A1 | 4/2010 | Krishnaprasad et al. |
| 2010/0312861 | A1 * | 12/2010 | Kolhi et al. ................. 709/219 |

(Continued)

OTHER PUBLICATIONS

Cioroianu, Andrei, Caching Dynamic Content with JSP 2.0, ONJava.com: The Independent Source for Enterprise Java, Jan. 5, 2005, <http://tim.oreilly.com/pub/a/onjava/2005/01/05/jspcache.html>.

(Continued)

*Primary Examiner* — Boris Gorney
*Assistant Examiner* — Griselle C Roland
(74) *Attorney, Agent, or Firm* — Patterson + Sheridan, LLP

(57) ABSTRACT

Techniques are described for scaling an in-memory data grid to satisfy the needs of client applications requesting data from the in-memory data grid. The in-memory data grid may monitor a variety of factors, such as data traffic or number of received queries from a particular geographical region, to determine whether to create a proximity grid. A proximity grid is an extension of the in-memory data grid that services queries originating from a defined geographic region. Each proximity grid stores data objects relevant to the proximity grid's assigned geographic region. Queries originating from the client applications within the geographic regions are then routed to the corresponding proximity grid for execution. The proximity grid may be terminated when the need of the client applications within the geographic region has subsided.

20 Claims, 7 Drawing Sheets

(56) References Cited

U.S. PATENT DOCUMENTS

2011/0041006 A1* 2/2011 Fowler .................. G06F 9/466
714/10
2011/0184936 A1* 7/2011 Lymberopoulos .........................
G06F 17/30902
707/721

OTHER PUBLICATIONS

IBM Software Group, WebSphere eXtreme Scale (WXS) Overview: WXS Grid Operation Explained, 2009, IBM, Armonk, New York, United States.
D'Hondt, Theo et al., Of first-class methods and dynamic scope, Sep. 2003, pp. 137-149, RSTL—L'objet, Cachan, France.
Costanza, Pascal, Dynamically Scoped Functions as the Essence of AOP, ACM SIGPLAN Notices, Aug. 2003, vol. 38, Issue 8, ACM, New York, New York, United States.

* cited by examiner

PROXIMITY GRIDS FOR AN IN-MEMORY DATA GRID

BACKGROUND

Field of the Invention

The present invention generally relates to data management, and more particularly, to creating a proximity grid for an in-memory data grid to serve queries received from a defined geographic region.

Description of the Related Art

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL) in the case of a relational database and a key-value pairs in the case of an object-oriented programming database. Upon receiving such a request, the DBMS may execute the request against a corresponding database, and return any result of the execution to the requesting entity.

As the workload for a database increases, particular requests may take a substantial amount of time and resources to execute. As such, database administrators may wish to scale the database to meet the increased workload. The scalability of a database refers to the ability of the database to increase total throughput under increased load when resources (i.e., hardware) are added.

SUMMARY

Embodiments of the invention provide a method, system and computer program product for providing a proximity grid for an in-memory data grid, where the proximity grid is associated with a geographic region. The method, system and computer program filter data stored in the in-memory data grid based on the relevance of the data stored in the in-memory data grid to the geographic region and create a proximity grid based on the filtered data, wherein data stored by the proximity grid comprises a subset of the data stored by the in-memory data grid. The method, system and computer program further determine a geographic location for a requesting entity that submits queries to the in-memory data grid and, upon determining that the geographic location of the requesting entity is within the geographic region, assigning any received queries from the requesting entity to the proximity grid.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
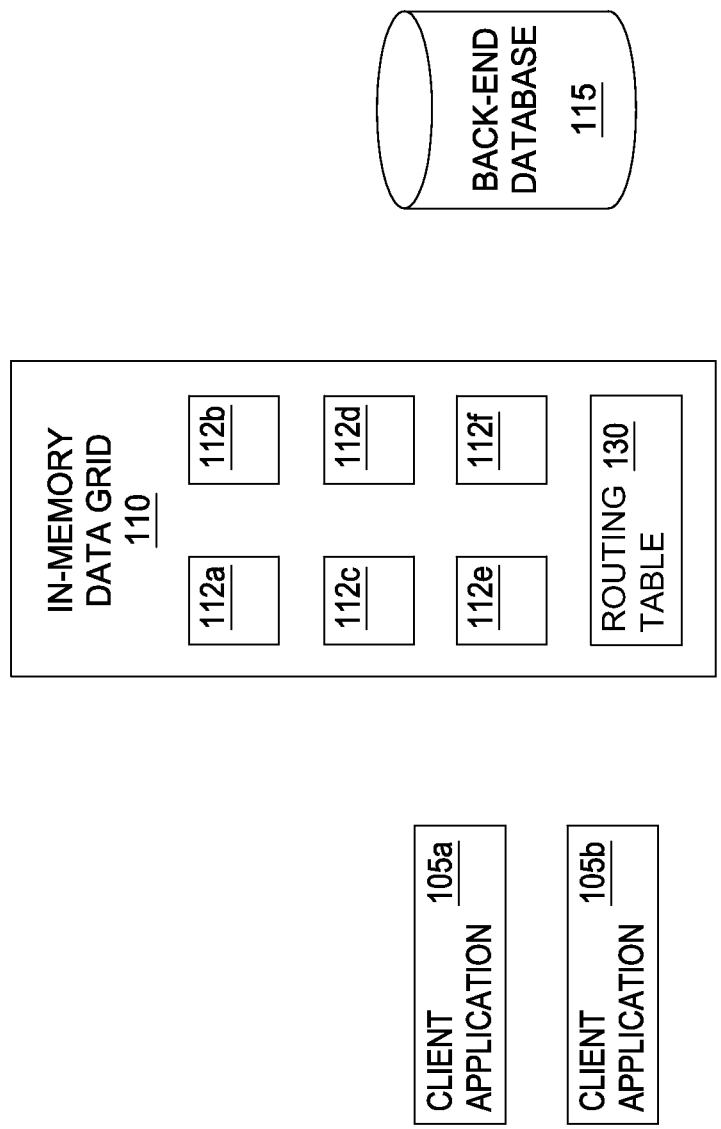
FIG. 1 is a block diagram illustrating a computer system configured to use an in-memory data grid, according to one embodiment of the invention.

An in-memory data grid stores data (e.g., objects) in memory rather than on storage devices such as disk drives. Moreover, the in-memory data grid divides the stored data into multiple partitions or containers that may be located on multiple computer resources. Doing so permits an in-memory data grid to scale efficiently when its workload increases. Because of the high scalability of an in-memory data grid, extensions of the in-memory data grid (i.e., a proximity grid) may be created to serve queries received from defined geographic regions. For example, the in-memory data grid may monitor its workload and determine that queries originating from a certain region of a country are using the majority of the resources available to the in-memory data grid. Accordingly, the in-memory data grid may use computer resources found in, or near, that region to generate a proximity grid. A grid management system for the in-memory data grid may then populate the proximity grid with data that is relevant to that geographic region. Further queries originating from that region are routed to the proximity grid for execution. Doing so takes advantage of the high scalability of an in-memory data grid by assigning the queries from a particular region to be executed by a proximity grid running on computer resources in or near that region.

In one embodiment, because the proximity grid is part of the in-memory data grid, it includes a subset of the data stored by the in-memory data grid. That is, if a data object is stored by the proximity grid, then that same data object is also stored at a different location in the in-memory data grid. This does not necessarily mean that the attributes of the object are the same; attributes may change based on subsequently received queries. However, the grid management system for the in-memory data grid may include a write-back protocol to synchronize the multiple objects. This protocol may be used periodically or only when a proximity grid is terminated.

In one embodiment, the proximity grid may be terminated when the data management system determines that the proximity grid is infrequently used. That is, the proximity grid is not receiving enough queries to justify the use of the local computer resources hosting the proximity grid. In such a case, the redundant objects stored in the proximity grid are written-back before the local computer resources are freed. The queries that would have been routed to the proximity grid are then routed to other parts of the in-memory data grid.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., the proximity grid) or related data available in the cloud. For example, the proximity grid or the in-memory data grid could execute on a computing system that is part of the cloud and respond to the queries accordingly. In such a case, the proximity grid may store data relevant to a particular location on computer resources used by the cloud that are geographically close to many of the users accessing the cloud. Doing so allows a user within that geographic location to access this information from any computing system attached to a network connected to the cloud (e.g., the Internet) and experience shorter response times than if the proximity grid was not formed.

FIG. 1 is a block diagram illustrating a computer system that uses an in-memory data grid, according to one embodiment of the invention. Computer system 100 includes a back-end database 115, an in-memory data grid 110 and client applications 105. The back-end database 115 may be any type of database, such as a relational or object-oriented database, that stores data on a combination of disk drives and memory. The back-end database 115 receives queries from a client application 105 (i.e., a requesting entity) and executes the queries by transmitting requested data to the client application 105 submitting the query. A client application 105 may be run on any computing system capable of querying a database such as a server, a personal computer, or other database. As the number of queries increases, however, the back-end database 115 becomes a bottleneck for the computer system 100 due to lock contention, I/O capabilities or network hops.

To alleviate this problem, an in-memory data grid 110 is middleware that may operate as an intermediary between the back-end database 115 and the client applications 105. That is, the in-memory data grid 110 is a distributed in-memory cache for the back-end database 115. The in-memory data grid 110 is distributed because it includes a plurality of containers 112 that may be run on separate computer resources. The containers 112 function as partitions that store portions of the data in the in-memory data grid 110. Combining the data stored by all of the containers 112 defines the total data stored by the in-memory data grid 110. An in-memory data grid 110 is distinct from an in-memory database which also stores data in memory rather than relying on disk storage. The in-memory database, however, is not a distributed database. Stated differently, the data is not divided into separate partitions—i.e., containers 112. An in-memory data grid 110, however, is divided into containers 112 that may be located on different computer resources. By virtualizing the memory address space associated with the containers 112, the containers 112 may each map to a portion of the shared address space though they may be run by different computing systems. IBM WebSphere® eXtreme Scale software is one example of an application that creates and maintains an in-memory data grid 110 (IBM and WebSphere are trademarks of International Business Machines Corporation, registered in many jurisdictions worldwide).

The routing table 130 maps data to the container 112 that stores the data. For example, the in-memory data grid 110 may use a hash function or key-value pairs to store data in the containers 112. The routing table 130 provides the client applications 105 with the necessary information to determine which container 112 has the needed data. The routing table 130 also permits the scalability mentioned above. As additional containers 112 are added and data is transferred between them, the in-memory data grid 110 updates the routing table 130 to track the changes.

In one embodiment, the in-memory data grid 110 stores data objects in the containers 112. That is, the in-memory data grid 110 may be an object-oriented database rather than a relational database. A data object is an instance of a class defined by an object-oriented programming language such as Java or C++ (Java and all Java-based trademarks and logos are trademarks or registered trademarks of Oracle and/or its affiliates). A data object may contain various attributes that are defined by the class. Examples of a data object include a user profile that maintains a list of the user's favorite websites or a HTTP session between a HTTP client and an HTTP server. Of course, these examples are for illustrative purposes only and are without limitation. Furthermore, a person of ordinary skill in the art will recognize the different objects and object-oriented programming languages that may be used in an object-oriented database in accordance with embodiments of the invention.

Each container 112 in the in-memory data grid 110 may be a Java Virtual Machine (JVM) that stores one or more data objects. As mentioned above, the JVMs may map to the same address or memory space. The in-memory data grid 110 may be expanded by increasing the number of JVMs and redistributing the data amongst them. In one embodiment, the in-memory data grid 110 creates copies of the data objects and stores them in a different JVM than the JVM that stores the original object. This practice improves the availability of in-memory data grid 110 by ensuring that if the JVM storing the original data object fails, a query can instead access the back-up copy. For example, the routing table 130 can be updated to point to the JVM containing the back-up data object.

Figure 2A:
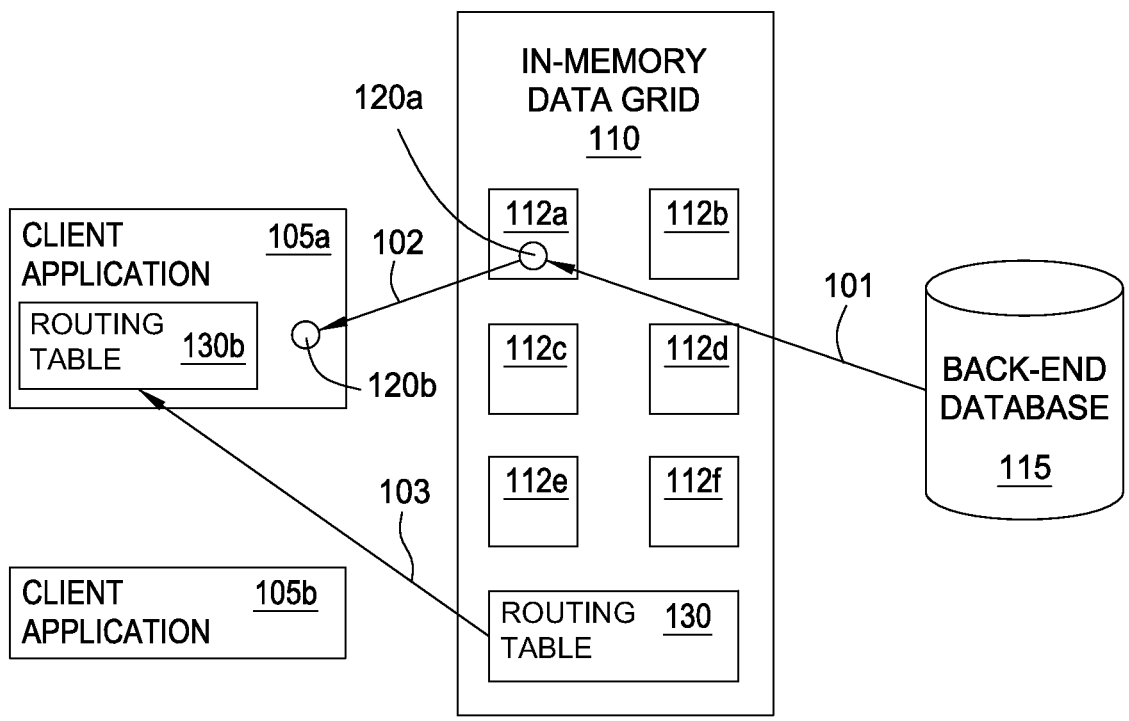
FIGS. 2A-2B illustrate a process for executing queries on a system that includes an in-memory data grid, according to one embodiment of the invention.
Figure 2B:
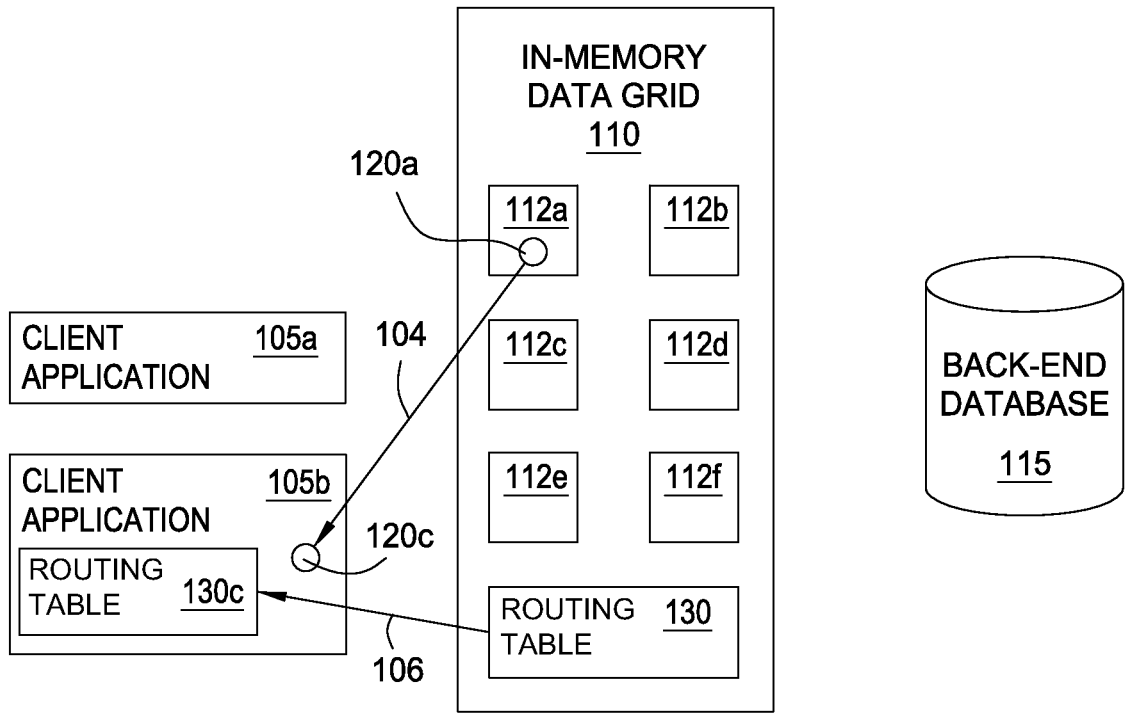

FIGS. 2A-2B illustrate a process for executing queries in a system that includes an in-memory data grid, according to one embodiment of the invention. FIG. 2A illustrates the process of accessing an object from an in-memory data grid 110 when the in-memory data grid 110 is accessed for the first time by a client application 105a. Similar to a cache, for the first query the in-memory data grid 110 does not contain the requested data. Though not shown, the client application 105a transmits a query to the in-memory data grid 110 which then relays the query to the back-end database 115. As shown by arrow 101, the object 120a is then loaded into container 112a. To complete the query, the in-memory data grid 110 transmits the object 120a, as shown by arrow 102, to the client application 105a which stores a copy of the object 120b. Note that the in-memory data grid 110 retains the object 120a. In one embodiment, the routing table 130a may be sent to the client application 105a. The client application 105a may then use its own local copy of the routing table 130b to directly access the objects stored in the containers 112 during subsequent queries. When the in-memory data grid 110 changes, an updated routing table 130 may be sent to the client application 105. Alternatively, the client application 105 may detect when the routing table 130 no longer points to the correct data. The client application 105 may then fetch an updated copy from the in-memory data grid 110.

FIG. 2B illustrates the process of accessing an object 120a already loaded into the in-memory data grid 110. The client application 105b transmits a query to in-memory data grid 110. If that query is the first communication between the in-memory data grid 110 and the client application 105b, the in-memory data grid 110 may transmit (via arrow 106) the routing table 130a to the client application 105b. In one embodiment, the in-memory data grid 110 may use the routing table 130a to locate the requested object without sending a copy of the routing table 130c to the client application 105b. In either case, the in-memory data grid 110 already has the object 120a loaded in a container 112a and transmits the object via arrow 104 to the client application 105b. Because the object 120a was already stored in the in-memory data grid 110, the client application 105b did not have to wait to query a back-end database 115 which may entail reading data from a storage device—e.g., a hard disk drive. Queries requesting objects stored in-memory data grid 110 benefit from a faster response time than queries accessing a typical back-end database 115.

Figure 3:
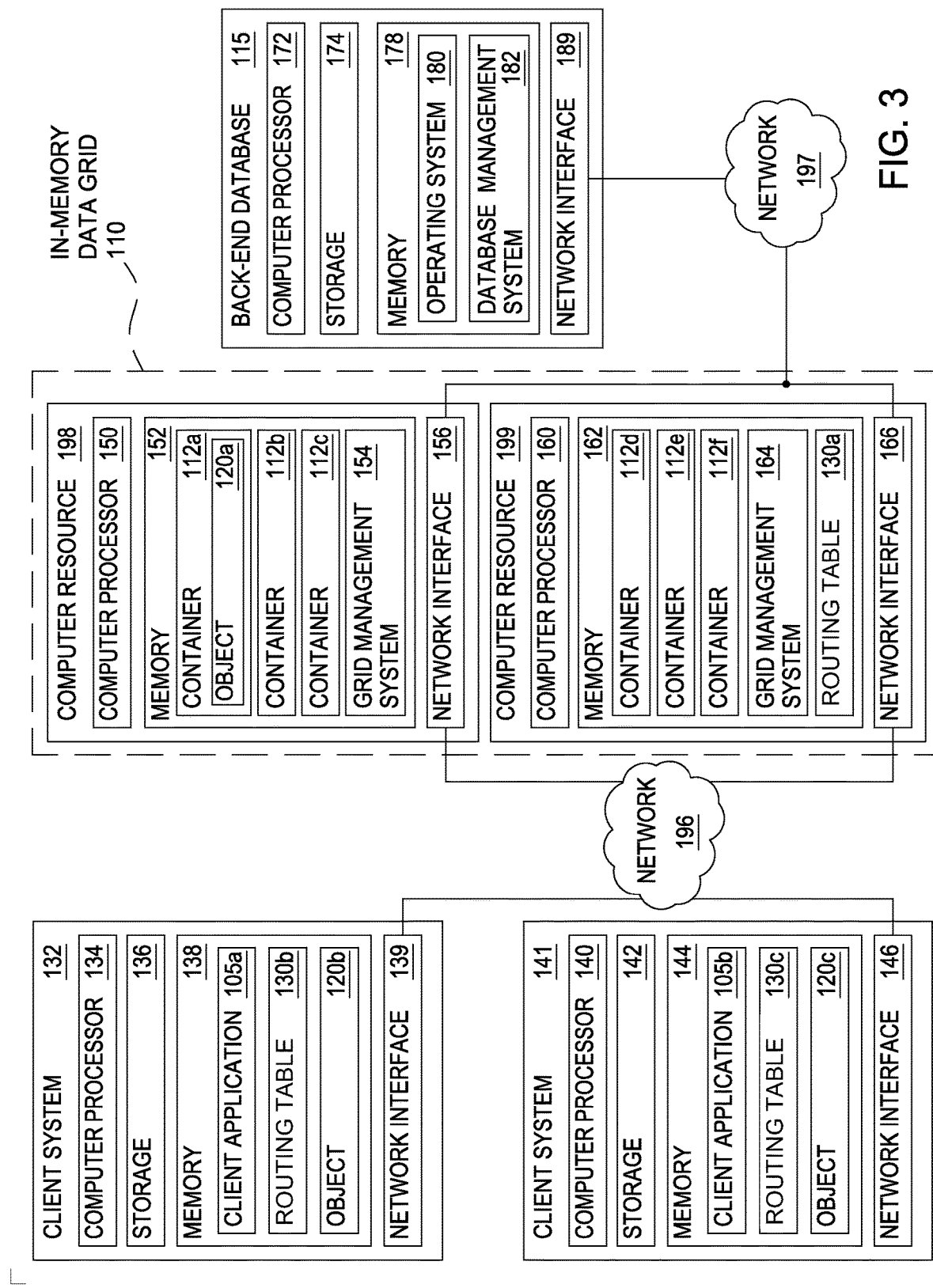
FIG. 3 is a block diagram of a networked system that uses an in-memory data grid, according to one embodiment of the invention.

FIG. 3 is a block diagram of a networked system that uses an in-memory data grid, according to one embodiment of the invention. FIG. 3 illustrates in more detail the system shown in FIG. 2B. As shown, the networked system contains two client systems 132, 141, the in-memory data grid 110 (both computer resource 198 and computer resource 199), and the back-end database 115. The client systems 132, 141 contain computer processors 134, 140, storage 136, 142, memories 138, 144 and network interfaces 139, 146. The computer processors 134, 140 may be any processor capable of performing the functions described herein. The client systems 132, 141 may connect to the network 196 using the network interfaces 139, 146. Furthermore, as will be understood by one of ordinary skill in the art, any computer system capable of performing the functions described herein may be used.

Illustratively, memories 138, 144 each contain the client applications 150, the routing table 130 and the object 120 which were described above. Although memories 138, 144 are shown as a single entity, memories 138, 144 may include one or more memory devices having blocks of memory associated with physical addresses, such as random access memory (RAM), read only memory (ROM), flash memory or other types of volatile and/or non-volatile memory. The client applications 150 are generally capable of generating database queries. Once the client applications 150 generate a query, the query may be submitted to a data grid management system (e.g., grid management system 154, 164) for execution over the network 196.

The in-memory data grid 110 contains two computer resources 198, 199. As mentioned previously, because the different containers 112 share the same virtual memory address space, the containers 112 may be distributed on separate memories 152,162 on separate computer resources 198, 199. These computer resources 198, 199 may also be located in different geographic locations. The in-memory data grid 110, 170 contains computer processors 150, 160, memories 152,162 and network interfaces 156, 166. Furthermore, as will be understood by one of ordinary skill in the art, any computer system capable of performing the functions described herein may be used.

In the pictured embodiment, memories 152,162 contain containers 112, object 120a, grid management systems 154, 164, and routing table 130a. Although memories 152,162 are shown as a single entity, memories 152,162 may include one or more memory devices having blocks of memory associated with physical addresses, such as random access memory (RAM), read only memory (ROM), flash memory or other types of volatile and/or non-volatile memory. The grid management systems 154, 164 control the functions of the in-memory data grid 110 much like a typical DBMS. In addition, the grid management systems 154, 164 may monitor the data traffic flowing from the in-memory data grids 110 and the client systems 132, 141. Based on this information, the grid management systems 154, 164 may create a proximity grid. This process will be discussed in greater detail below. Moreover, the grid management systems 154, 164 may form a master-slave relationship to create a hierarchy. In this manner, the slave grid management system would report up to the master grid management system and receive instructions from that system. For the sake of clarity, only one grid management system—system 154—will be discussed, although both grid management systems 154, 164 may operate in tandem to perform the disclosed capabilities.

The back-end database 115 contains a computer processor 172, storage 174, memory 178 and a network interface 184. The computer processor 172 may be any processor capable of performing the functions described herein. The database system 170 may connect to the network 197 using the network interface 184. The network 197 may be the same or different than the network 196. For example, network 197 may be a LAN while network 196 is a WAN—e.g., the Internet. Furthermore, as will be understood by one of ordinary skill in the art, any computer system capable of performing the functions described herein may be used.

Memory 178 contains an operating system 180 and a DBMS 182. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 182 may be any DBMS capable of creating and maintaining a database. The operating system 180 may be any operating system capable of performing the functions described herein.

Figure 4:
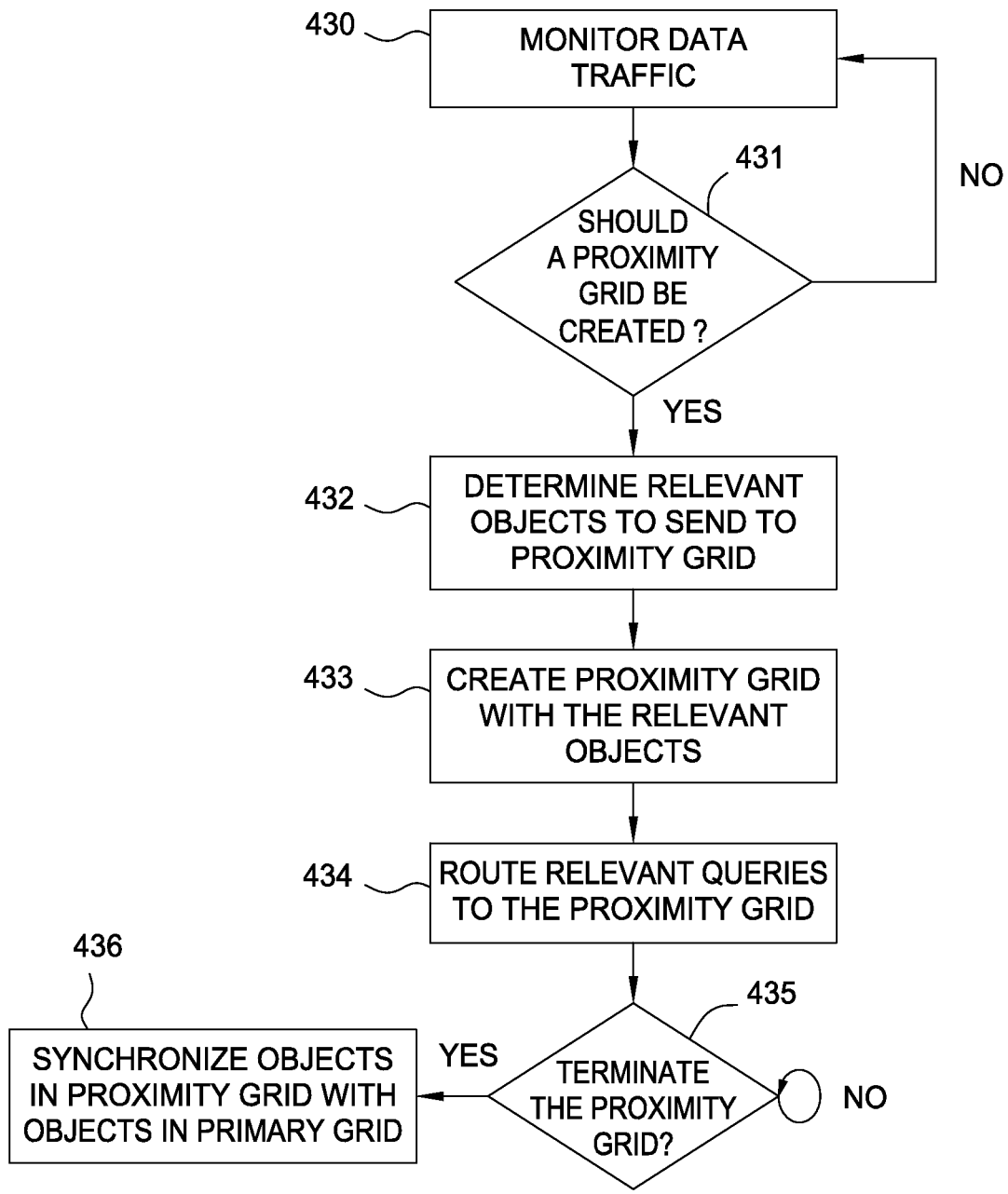
FIG. 4 is a flow chart illustrating the formation of a proximity grid for an in-memory data grid, according to embodiments of the invention.

FIG. 4 is a flow chart illustrating the formation of a proximity grid for an in-memory data grid, according to embodiments of the invention. At step 430, the grid management system 154 monitors data traffic flowing into, and out of, the in-memory data grid 110. The grid management system 154 may monitor, for instance, the number of queries submitted by the client applications 105 in a specified geographic region to the in-memory data grid 110 or the amount of data (bits/sec) transmitted from the in-memory data grid 110 to the client applications 105 in a specified geographic region. To do this, the grid management system 154 may monitor the geographic location of the client application 105 submitting the query. For example, the grid management system 154 may determine the percentage of queries received from different regions in a country based on the number of total queries received by the in-memory data grid 110. A similar process could be used to track the amount of data the grid management system 154 transmits to a certain region. Moreover, in one embodiment, the grid management system 154 may monitor the amount of data flowing between the in-memory data grid 110 and the back-end database 115.

Figure 5:
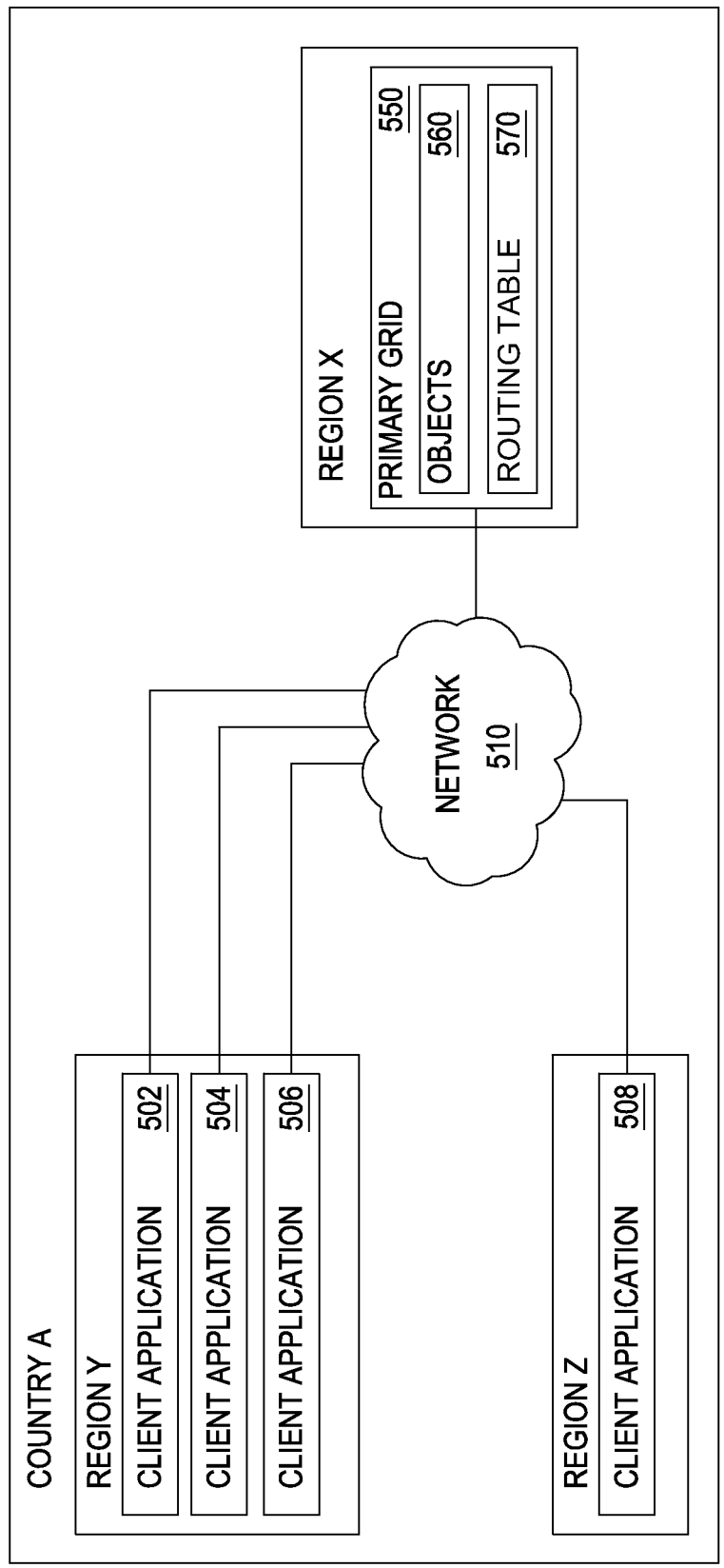
FIG. 5 illustrates an in-memory data grid that may benefit from a proximity grid, according to one embodiment of the invention.

FIG. 5 illustrates an in-memory data grid that benefits from a proximity grid, according to one embodiment of the invention. FIG. 5 shows country A that is divided up into at least three geographic regions—regions X, Y and Z. Region X contains a primary grid 550 which is an in-memory data grid. The primary grid 550, and the corresponding computer resources running the grid are located entirely in Region X. Client applications 502, 504 and 506 are geographically located in Region Y while client application 508 is located in Region Z. As discussed at step 430 in FIG. 4, a grid management system 154 of the primary grid 550 monitors the data traffic flowing from the primary grid 550 to the various client applications 502, 504, 506, 508 via the network 510. The primary grid 550 transmits objects 560 to the client applications 502, 504, 506, 508 in response to their queries. In one embodiment, each client application 502, 504, 506, 508 is given a copy of the routing table 570 to access object 560 in the multiple containers (not shown) found within the primary grid 550. Based on the data traffic, the grid managements system 154 for the primary grid 550 may determine to establish a proximity grid for one or both of the regions.

Returning to FIG. 4, at step 431 the grid management system 154 determines whether a proximity grid should be created. In one embodiment, the grid management system 154 may receive a request from a database administrator to create the proximity grid. In another embodiment, the grid management system 154 may automatically create the proximity grid based on the anticipated occurrence of a particular event. For example, client application 502 may be a store that sells back-to-school supplies. During the weeks prior to school resuming, the client application 502 increases its queries to the primary grid 550 by 50%. The grid management system 154 may anticipate the increased workload based on historical data and decide to establish a local proximity grid to service the geographic region where client application 502 is located.

In one embodiment, predetermined thresholds may be used by the grid management system 154 to determine whether to create a proximity grid. For example, the grid management system 154 may have stored a threshold for the number of queries received from a defined geographic region during a specified amount of time—e.g., the number queries per day. Similarly, the grid management system 154 may have a predetermined threshold for the amount of data being transmitted in a specified amount of time to a geographic region—e.g., gigabytes per day. Once a threshold has been exceeded, the grid management system 154 creates a proximity grid. For example, the grid management system 154 may ignore the number of client applications in a region and instead focus solely on the data traffic being transmitted to a region. Referring to FIG. 5, region Y has three client applications 502, 504, 506 while region Z only has one client application 508. Nonetheless, region Z may meet the one or more thresholds and justify forming a proximity grid to service that region before region Y because of the amount of data traffic or queries originating from client application 508.

In one embodiment, instead of monitoring data traffic according to predefined regions, the grid management system 154 monitors the data traffic for all the queries and attempts to discover a region where the thresholds are exceeded—i.e., the grid management system 154 dynamically adjusts the geographic region. For example, the grid management system 154 may pick a geographic location and begin to define a region around that location (e.g., a circle where the geographic location is the center point of the circle). As the grid management system 154 expands the region, the grid management system 154 uses the monitored data traffic to ascertain whether queries originating from client applications within that region have exceeded the predetermined threshold(s). Specifically, the grid management system 154 may center the regions around available local computer resources that have the capability of hosting a proximity grid. The grid management system 154 may stop expanding the region, for example, when the boundary of the region is as close to the center of the region (i.e., the location of the local computer resources) as to the computer resource running the primary grid. In this manner, the grid management system 154 could dynamically alter the region to determine the most efficient location for a proximity grid and the client applications the proximity grid would service. A person skilled in the art will recognize that a variety of ways to dynamically adjust the regions to determine where to create a proximity grid exist, consistent with embodiments of the present invention.

In one embodiment, the grid management system 154 considers a combination of weighted factors. For example, the grid management system 154 may assign a greater weight to the amount of data transmitted to a region than to the number of queries received from the region. Other factors that may be considered include the bandwidth of the network 510 in the region or the number of client applications located in the region irrespective of the current number of queries those client applications are submitting.

Figure 6:
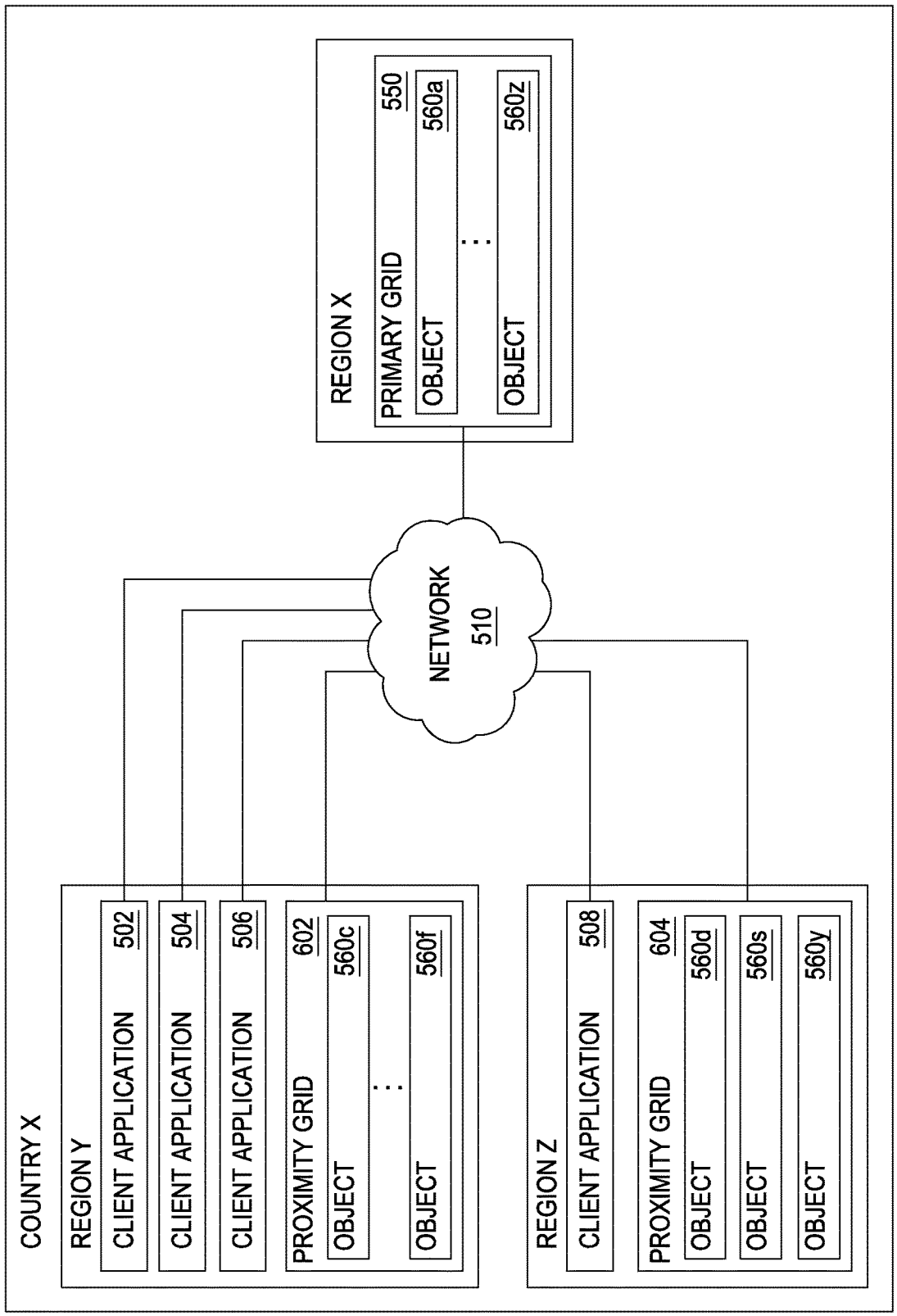
FIG. 6 illustrates an in-memory data grid with geographic specific proximity grids, according to one embodiment of the invention.

FIG. 6 illustrates an in-memory data grid with geographic specific proximity grids, according to one embodiment of the invention. In FIG. 6, the grid management system 154 of the primary grid 550 created a proximity grid 602 in Region Y and a proximity grid 604 in Region Z. The decision to create the proximity grids 602, 604 could have been based on any of the methods described in step 431. As shown, the proximity grids 602, 604 are located within the respective regions. However, the proximity grids 602, 604 may be located outside of the defined region. For example, proximity grid 602 may be located outside the borders of Region Y but still serve the defined region. That is, even if proximity grid 602 is geographically located outside Region Y, the queries serviced by proximity grid 602 may execute faster than if the queries were sent to primary grid 550. For example, the proximity grid 602 may be located between Region Y and the primary grid 550.

Returning to FIG. 4, at step 432 the grid management system 154 filters the objects stored in the primary grid to determine which objects to store in the proximity grid. In one embodiment, the grid management system 154 filters the object based on the relevance of the object to the geographic region. For example, the client application 502 may have originally placed certain data in the primary grid for storage. Accordingly, that data will be associated with region Y. When proximity grid 602 is created, the grid management system 154 populates proximity grid 602 with the relevant data. In another embodiment, the grid management system 154 may track which client applications access the data. If data is frequently used by a client application, then that data may be flagged so that the data is transmitted to any proximity grid established to service a geographic region that includes the client application. Moreover, the grid management system 154 may identify relevant data based on whether a group of applications in a geographic region, e.g., client applications 502, 504, 506, access similar data. Though certain data may be accessed equally by several client applications, those applications may all be located in a particular region. Accordingly, the grid management system 154 may also flag the data in case a proximity grid is established for that region.

At step 433, the grid management system 154 issues the commands to create a proximity grid and populates the grid with the filtered data that is relevant to a geographic region serviced by the proximity grid. In one embodiment, the proximity grid is run by computer resources that are located within the geographic region service by the proximity grid. Alternatively, the proximity grid could be located outside of the region. More generally, any location for the proximity grid that decreases the time for completing queries submitted by applications located in a specified geographic region relative to the time necessary for completing those queries if executed by the primary grid is envisioned by this disclosure. For example, the proximity grid may even be located farther away from the geographic region than the primary grid and still satisfy this characteristic. For example, the proximity grid may be located on a fiber optic backbone that directly services the region which drastically increases the achievable data rates to the region. The computer resources hosting primary grid, in contrast, may not have this type of high-speed network available, and thus, may fulfill the queries submitted by client applications from the geographic region more slowly.

In one embodiment, a plurality of JVMs (i.e., containers) is instantiated in the memory of the computer resources to form the proximity grids 602, 604. The filtered data is then sent to the JVMs while the corresponding routing table for the primary grid 550 is updated to reflect the addition of the proximity grids to the in-memory data grid.

As discussed earlier, the proximity grids 602, 604 may contain a subset of the data stored in the primary grid 550. Also, proximity grids 602, 604 share the same virtual address space as primary grid 550 thereby making the grids 550, 602, 604 part of the same in-memory data grid. For example, proximity grid 602 contains objects 560c-f which are a subset of the objects 560a-z stored in the primary grid 550. Also, proximity grid 604 has objects 560d,s,y which are a subset of the objects 560a-z stored in the primary grid 550. The objects stored in the respective grids, however, may have different values for the attributes that the objects define. Moreover, the objects stored in proximity grids do not need to be exclusive of each other. For example, object 560d is stored in both proximity grid 602 and proximity grid 604. This may occur if the geographic regions served by two proximity grids overlap. However, a client application accesses the data from only one of the proximity grids.

At step 434, the grid management system 154 routes relevant queries to a proximity grid. After a proximity grid is started and populated with relevant data, the client applications may still send at least one more query to the primary grid. In one embodiment, the client applications in a region assigned to a proximity grid may send a query to the primary grid, but receive an updated routing table (e.g., routing table 130b shown in FIG. 2A) which provides the necessary information for accessing the proximity grid directly. The next time the client application needs to access information on the in-memory data grid, the client application may directly query the proximity grid servicing the client application's geographic region. By providing the updated routing table, the in-memory data grid routes the rest of the queries to the proximity grid. Stated differently, each received query is assigned to either a primary or proximity grid within the in-memory data grid based on the location of the client application that transmitted the query. For example, all client applications located in region Y are routed to proximate grid 602 while all other queries are executed by the primary grid 550 (assuming no other proximity grids). Maintaining the routing table is one manner of assigning the received queries to an associated proximity or primary grid.

In another embodiment, the client applications have their queries rerouted to the proper proximity grid each time the client application queries the in-memory data grid. The client applications send each query to the primary grid 550 which then reroutes the query to the appropriate proximity grid based on the location of the client application. That is, the client applications do not maintain a local copy of the routing table. The location of the client application may be obtained in a variety of ways such as requiring the location to be manually entered into each query or by determining an IP address associated with the query.

At step 435, the grid management system 154 determines whether to maintain or terminate the proximity grid 602, 604. This decision could be made by a grid management system 154 located on either a primary grid or a proximity grid. To make the decision, the grid management system 154 may compare the usage of the proximity grid to certain criteria.

In one embodiment, the grid management system 154 terminates the proximity grid if it does not meet one or more predetermined thresholds. For example, the thresholds may be the same thresholds used when determining whether to create the proximity grid as discussed at step 431—i.e., a threshold number of received queries from a geographic area or the amount of data traffic. If the client applications in the relevant geographic region no longer provide enough data traffic to meet the one or more thresholds, the grid management system 154 may terminate the grid.

In one embodiment, the grid management system 154 may terminate the proximity grid according to a termination time. The proximity grid may have a predetermined timer that defines how long to maintain the proximity grid. When that timer expires, the grid management system 154 terminates the proximity grid. Other criteria may include terminating the proximity grid if the local computer resources are needed for a different task or if a database administrator requests that the proximity grid terminates. Terminating a proximity grid may mean updating the virtual memory space of the in-memory data grid to exclude containers stored in the proximity grid, stopping a grid management system 154 associated with the proximity grid, or shutting down the computer resources running the proximity grid. A person skill in the art will recognize the variety of ways of removing a proximity grid from an in-memory data grid as described herein.

If the grid management system 154 determines not to terminate the proximity grid based one or more criteria, then step 435 may continue to loop. In one embodiment, the grid management system 154 may periodically ascertain whether the proximity grid meets the termination criteria. In another embodiment, the grid management system 154 may wait for a flag to indicate that the proximity grid should be terminated—e.g., a timer expires.

At step 436, after the grid management system 154 decides to terminate the proximity grid—e.g., proximity grids 602, 604—the grid management system 154 may synchronize the objects stored in the proximity grid with the corresponding objects in the primary grid—e.g., primary grid 550. As mentioned previously, the proximity grid may contain a subset of the data (e.g., objects) stored in the primary grid. At step 434, the grid management system 154 routed the queries from client applications in relevant geographic areas to the proximity grid for execution. Accordingly, the queries may have accessed and changed the objects stored by the proximity grid while the corresponding objects in the primary grid were not. When the grid management system 154 determines that a proximity grid should be terminated, a write-back protocol may be used to ensure that any changes to the objects are not lost.

In one embodiment, the grid management system 154 writes-back the update according to a timestamp associated with the objects. For example, referring to FIG. 6, object 560c stored in proximity grid 602 may have a more recent timestamp than object 560c stored in primary grid 550. The timestamp may reflect when the attributes defined by the object were changed. The write-back protocol may compare the timestamps associated with the two duplicative objects and overwrite the object 560c stored in the primary grid 550 with the object 560c stored in the proximity grid 602 if the object 560c stored in the proximity grid 602 has the more recent timestamp. If the object 560c stored in the primary grid 602 does not have the more recent timestamp, than the object 560c stored in the primary grid 550 is unchanged. This protocol may also be used when an object is stored in multiple proximity grids.

In another embodiment, the grid management system 154 may not compare timestamps and instead always replace the objects stored in the primary grid with the objects stored in the proximity grid (with or without determining if the attributes of the objects are different). For example, the grid management system 154 may overwrite objects 560c-f of the primary grid 550 with objects 560c-f stored in the proximity grid 602. Or the grid management system 154 may first determine if the values for the attributes of the objects in the primary grid are different from the values of the attributes of the objects in the proximity grid and replace only the objects in the primary grid that are dissimilar from the objects in the proximity grid. A person of ordinary skill in the art will recognize the different write-back protocols may be used in the database hierarchy described herein.

Although step 436 follows step 435 in FIG. 4, the grid management system 154 may use the write-back protocol to synchronize the objects in a proximity grid to the duplicative objects in the primary grid even before the grid management system 154 decides to terminate the proximity grid. This synchronization may, for instance, occur periodically, upon an occurrence of a special event, or upon a request by a database administrator.

Figure 7:
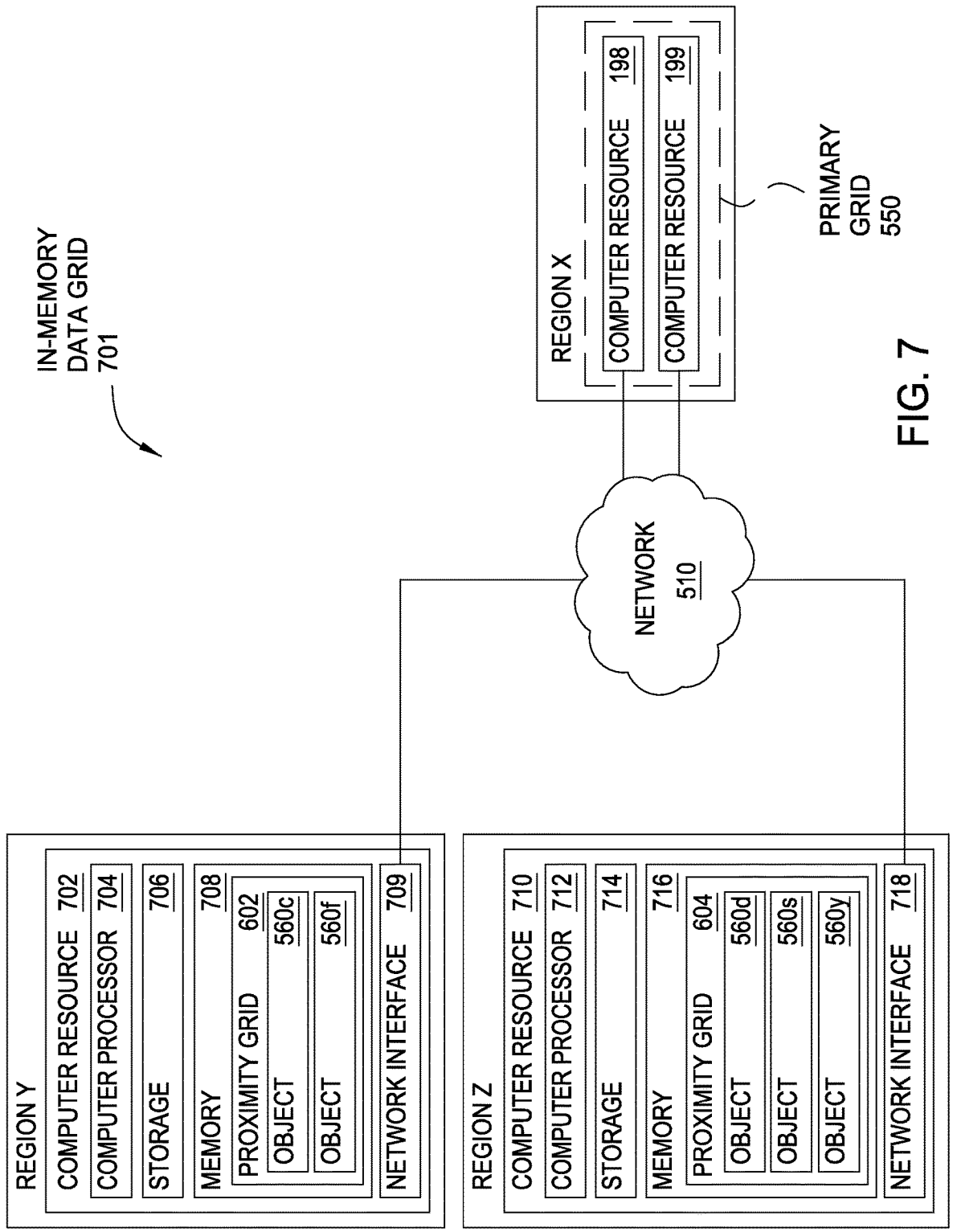
FIG. 7 is a block diagram of a networked in-memory data grid which includes proximity grids, according to one embodiment of the invention.

FIG. 7 is a block diagram of a networked in-memory data grid which includes proximity grids, according to one embodiment of the invention. The in-memory data grid 701 is run on computer resources located in geographic regions X, Y, and Z. Region X contains two computer resources 198 and 199 which are illustrated in more detail in FIG. 3. Computer resource 198, 199 run the primary grid 550 which contains duplicates of all the data stored in the proximity grids 602, 604. Though shown as being located solely in region X, virtualization permits primary grid 550 to be run on multiple computer resources located in one or more geographic regions.

Proximity grids 602, 604 are run on a computer resource 702, 710, respectively, which has a computer processor 704, 712, storage 706, 714, memory 708, 716 and a network interface 709, 718. Computer resource 702 is located in geographic region Y while computer resource 710 is located in region Z. However, as discussed above, computer resource(s) hosting a proximity grid may be located outside of the geographic region assigned to the proximity grid. For example, proximity grid 602 may service all queries from client applications located in region Y but the computer resource running the proximity grid 602 may be located outside of region Y. Though FIG. 7 shows proximity grids 602, 604 as being located solely in region X and Y, respectively, virtualization permits both proximity grids 602, 604 to be run on multiple computer resources located in one or more geographic regions by making the distribution of data in the in-memory data grid transparent to the back-end database and the client applications.

The computer processors 704, 712 may be any processor capable of performing the functions described herein. The computer resources 702, 710 may connect to the network 510 using the network interfaces 709, 718. The storage devices 706, 714 are not used by the in-memory data grid 701 but may be used by a back-end database that uses the in-memory data grid 701 as middleware. Furthermore, as will be understood by one of ordinary skill in the art, any computer system capable of performing the functions described herein may be used.

The memories 708, 716 contain proximity grids 602, 604. Although memories 708, 716 are shown as a single entity, memories 708, 716 may include one or more memory devices having blocks of memory associated with physical addresses, such as random access memory (RAM), read only memory (ROM), flash memory or other types of volatile and/or non-volatile memory. Proximity grid 602 includes object 560c-f while proximity grid 604 includes object 560d,s,y. For clarity, the containers (e.g., JVMs) which store the objects have been omitted. Moreover, the proximity grids 602, 604 may have associated grid management systems (not shown) to receive, process, and execute queries from client applications. In one embodiment, the grid management system 154 performs all the functions described above of the grid management system 154 in FIG. 3. The primary grid 550, the proximity grids 602, 604 and their associated computer resources 198, 199, 702, 710 comprise the in-memory data grid 701.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for dividing an in-memory data grid comprising a plurality of containers into a proximity grid and a primary grid, wherein the plurality of containers are associated with the primary grid, and wherein the proximity grid is associated with a geographic region, the method comprising:

filtering data stored in one or more of the plurality of containers associated with the primary grid based on the relevance of the data stored in the primary grid to the geographic region;

upon determining that an amount of traffic between the in-memory data grid and a plurality of client applications in the geographic region exceeds a first predefined threshold, identifying computing resources located within the geographic region to host the proximity grid;

creating the proximity grid on the identified computing resources based on the filtered data;

associating one or more of the plurality of containers with the proximity grid such that the one or more containers are hosted on the identified computing resources;

storing the filtered data in the one or more containers associated with the proximity grid, wherein data stored by the proximity grid comprises a subset of the data stored by the primary grid, wherein the one or more containers associated with the primary and proximity grids share a virtualized address space, and wherein the proximity grid and the primary grid are intermediaries between the client applications that submit queries to the in-memory data grid and a back-end database;

determining a geographic location for a first client application that submits queries to the in-memory data grid;

upon determining that the geographic location of the first client application is within the geographic region, providing an updated container routing table assigning received queries from the first client application to the proximity grid, wherein the first client application, based on the routing table, determines whether to access one of the containers associated with the primary grid and the containers associated with the proximity grid to retrieve the data associated with the queries; and upon determining that the number of queries originating from the client applications in the geographic region has fallen below a second predefined threshold, terminating the proximity grid by updating the virtual memory space of the in-memory data grid.

2. The method of claim 1, wherein the stored data in the proximity grid comprises a plurality of data objects, the data objects being formed by an object-oriented programming language, wherein the primary grid maintains copies of the plurality of data objects stored in the proximity grid and wherein the container routing table ensures that the first client application retrieves the plurality of data objects from only one of the primary grid and the proximity grid.

3. The method of claim 2, further comprising:
periodically synchronizing the plurality of data objects stored in the proximity grid with the copies of the plurality of data objects stored in the primary grid, wherein synchronizing the plurality of data objects further comprises:
determining whether timestamps of the plurality of data objects in the proximity grid are more recent than timestamps of the copies of the plurality of data objects in the primary grid; and
if so, replacing the copies of the plurality of data objects with the plurality of data objects with the more recent timestamps.

4. The method of claim 2, wherein the one or more containers associated with the proximity grid and the one or more containers associated with the primary grid are Java virtual machines that store the plurality of data objects.

5. The method of claim 1, further comprising, determining whether to create the proximity grid for the in-memory data grid in the geographic region in anticipation of a future event.

6. The method of claim 1, further comprising, after creating the proximity grid, terminating the proximity grid based on at least one of (i) an expiration of a predetermined time, (ii) the proximity grid receiving a predetermined minimum of queries originating from the geographic region and (ii) a predetermined minimum amount of data traffic being transmitted to the geographic region by the proximity grid.

7. The method of claim 1, wherein filtering data stored in the primary grid based on the relevance of the data stored in the primary grid to the geographic region further comprises determining if the data stored in the primary grid was previously accessed by a query originating from an application located in the geographic region.

8. A computer program product for dividing an in-memory data grid comprising a plurality of containers into a proximity grid and a primary grid, wherein the plurality of containers are associated with the primary grid, and wherein the proximity grid is associated with a geographic region, the computer program product comprising:
a computer-readable storage memory having computer-readable program code embodied therewith, the computer-readable program code configured to:
filter data stored in the one or more of the plurality of containers associated with the primary grid based on the relevance of the data stored in the primary grid to the geographic region;
upon determining that an amount of traffic between the in-memory data grid and a plurality of client applications in the geographic region exceeds a first predefined threshold, identifying computing resources located within the geographic region to host the proximity grid;
create the proximity grid on the identified computing resources based on the filtered data;
associate one or more of the plurality of containers with the proximity grid such that the one or more containers are hosted on the identified computing resources; and
store the filtered data in the one or more containers associated with the proximity grid, wherein data stored by the proximity grid comprises a subset of the data stored by the primary grid, wherein the one or more containers associated with the primary and proximity grids share a virtualized address space, and wherein the proximity grid and the primary grid are intermediaries between the client applications that submit queries to the in-memory data grid and a back-end database;
determine a geographic location for a first client application that submits queries to the in-memory data grid;
upon determining that the geographic location of the first client application is within the geographic region, providing an updated container routing table assigning received queries from the first client application to the proximity grid, wherein the first client application, based on the routing table, determines whether to access one of the containers associated with the primary grid and the containers associated with the proximity grid to retrieve the data associated with the queries; and upon determining that the number of queries originating from the client applications in the geographic region has fallen below a second predefined threshold, terminating the proximity grid by updating the virtual memory space of the in-memory data grid.

9. The computer program product of claim 8, wherein the stored data in the proximity grid comprises a plurality of data objects, the data objects being formed by an object-oriented programming language, wherein the primary grid maintains copies of the plurality of data objects stored in the proximity grid and wherein the container routing table ensures that the first client application retrieves the plurality of data objects from only one of the primary grid and the proximity grid.

10. The computer program product of claim 9, further comprising computer-readable program code configured to:
periodically synchronize the plurality of data objects stored in the proximity grid with the copies of the plurality of data objects stored in the primary grid, wherein synchronizing the plurality of data objects further comprises:
determining whether timestamps of the plurality of data objects in the proximity grid are more recent than timestamps of the copies of the plurality of data objects in the primary grid; and
if so, replacing the copies of the plurality of data objects with the plurality of data objects with the more recent timestamps.

11. The computer program product of claim 9, wherein the one or more containers associated with the proximity grid and the one or more containers associated with the primary grid are Java virtual machines that store the plurality of data objects.

12. The computer program product of claim 8, further comprising computer-readable program code configured to determine whether to create the proximity grid for the in-memory data grid in the geographic region in anticipation of a future event.

13. The computer program product of claim 8, further comprising computer-readable program code configured to, after creating the proximity grid, terminate the proximity grid based on at least one of (i) an expiration of a predetermined time, (ii) the proximity grid receiving a predetermined minimum of queries originating from the geographic region and (ii) a predetermined minimum amount of data traffic being transmitted to the geographic region by the proximity grid.

14. The computer program product of claim 8, wherein filtering data stored in the primary grid based on the relevance of the data stored in the primary grid to the geographic region further comprises determining if the data stored in the primary grid was previously accessed by a query originating from an application located in the geographic region.

15. A system, comprising:
a computer processor; and
a memory containing a program that, when executed on the computer processor, divides an in-memory data grid comprising a plurality of containers into a proximity grid and a primary grid, wherein the plurality of containers are associated with the primary grid, and wherein the proximity grid is associated with a geographic region, the program comprising:
filtering data stored in one or more of the plurality of containers associated with the primary grid based on the relevance of the data stored in the primary grid to the geographic region;
upon determining that an amount of traffic between the in-memory data grid and a plurality of client applications in the geographic region exceeds a first predefined threshold, identifying computing resources located within the geographic region to host the proximity grid;
creating the proximity on the identified computing resources grid based on the filtered data;
associating one or more of the plurality of containers with the proximity grid such that the one or more containers are hosted on the identified computing resources;
storing the filtered data in the one or more containers associated with the proximity grid, wherein data stored by the proximity grid comprises a subset of the data stored by the primary grid, wherein the one or more containers associated with the primary and proximity grids share a virtualized address space, and wherein the proximity grid and the primary grid are intermediaries between the client applications that submit queries to the in-memory data grid and a back-end database;
determining a geographic location for a first client application that submits queries to the in-memory data grid;
upon determining that the geographic location of the first client application is within the geographic region, providing an updated container routing table assigning received queries from the first client application to the proximity grid, wherein the first client application, based on the routing table, determines whether to access one of the containers associated with the primary grid and the containers associated with the proximity grid to retrieve the data associated with the queries; and
upon determining that the number of queries originating from the client applications in the geographic region has fallen below a second predefined threshold, terminating the proximity grid by updating the virtual memory space of the in-memory data grid.

16. The system of claim 15, wherein the stored data in the proximity grid comprises a plurality of data objects, the data objects being formed by an object-oriented programming language, wherein the primary grid maintains copies of the plurality of data objects stored in the proximity grid and wherein the container routing table ensures that the first client application retrieves the plurality of data objects from only one of the primary grid and the proximity grid.

17. The system of claim 16, further comprising:
periodically synchronizing the plurality of data objects stored in the proximity grid with the copies of the plurality of data objects stored in the primary grid, wherein synchronizing the plurality of data objects further comprises:
determining whether timestamps of the plurality of data objects in the proximity grid are more recent than timestamps of the copies of the plurality of data objects in the primary grid; and
if so, replacing the copies of the plurality of data objects with the plurality of data objects with the more recent timestamps.

18. The system of claim 16, wherein the one or more containers associated with the proximity grid and the one or more containers associated with the primary grid are Java virtual machines that store the plurality of data objects.

19. The system of claim 15, further comprising, after creating the proximity grid, terminating the proximity grid based on at least one of (i) an expiration of a predetermined time, (ii) the proximity grid receiving a predetermined minimum of queries originating from the geographic region and (ii) a predetermined minimum amount of data traffic being transmitted to the geographic region by the proximity grid.

20. The method of claim 1, wherein, determining that the amount of traffic between the in-memory data grid and the plurality of client applications in the geographic region exceeds the first predefined threshold comprises:
   monitoring queries received at the in-memory data grid to determine the number of queries received from client applications located within a plurality of predefined geographic regions, and
   wherein before determining that the amount of traffic between the in-memory data grid and the plurality of client applications in the geographic region exceeds the first predefined threshold, there are no computing resources located within the geographic region that host the proximity grid.

* * * * *